US012203609B2

(12) United States Patent
Rizvi et al.

(10) Patent No.: US 12,203,609 B2
(45) Date of Patent: Jan. 21, 2025

(54) LAMP FOR DISPLAYING MULTI-COLOR LIGHTING EFFECTS

(71) Applicant: Razer (ASIA-PACIFIC) PTE LTD., Singapore (SG)

(72) Inventors: Farrukh Raza Rizvi, Singapore (SG); Wooi Liang Chin, Singapore (SG); Yi Wei Lim, Singapore (SG)

(73) Assignee: Razer (ASIA-PACIFIC) PTE LTD., Singapore (SG)

( * ) Notice: Subject to any disclaimer, the term of this patent is extended or adjusted under 35 U.S.C. 154(b) by 0 days.

(21) Appl. No.: 18/689,502

(22) PCT Filed: Sep. 8, 2021

(86) PCT No.: PCT/SG2021/050542
§ 371 (c)(1),
(2) Date: Mar. 6, 2024

(87) PCT Pub. No.: WO2023/038570
PCT Pub. Date: Mar. 16, 2023

(65) Prior Publication Data
US 2024/0328587 A1 Oct. 3, 2024

(51) Int. Cl.
*F21S 10/02* (2006.01)
*F21S 9/02* (2006.01)
(Continued)

(52) U.S. Cl.
CPC ................ *F21S 10/02* (2013.01); *F21S 9/02* (2013.01); *F21V 1/14* (2013.01); *F21V 3/049* (2013.01);
(Continued)

(58) Field of Classification Search
CPC .. F21V 33/0056; F21V 23/0485; F21V 21/14; F21V 21/146; F21Y 2113/10;
(Continued)

(56) References Cited

U.S. PATENT DOCUMENTS 7,513,653 B1 * 4/2009 Liu ......................... F21K 9/232 362/373
8,919,996 B2 12/2014 Kim
(Continued)

FOREIGN PATENT DOCUMENTS

CN 201022481 Y 2/2008
CN 101603634 A1 12/2009
(Continued)

OTHER PUBLICATIONS

Corsair Launches iCUE LT100 Smart Lighting Towers (https://www.teckknow.com/corsair-launches-icue-It100-smart-lighting-towers/).
(Continued)

*Primary Examiner* — Abdulmajeed Aziz
*Assistant Examiner* — Steven Y Horikoshi
(74) *Attorney, Agent, or Firm* — Polsinelli PC

(57) ABSTRACT

A lamp including a light emitting module having a base substrate with a mounting surface, a plurality of white-light emitting elements disposed on the mounting surface in a circular arrangement with a central axis extending from a center thereof, an elongated support structure extending longitudinally along the central axis from the mounting surface, and at least one row of red-green-blue-light emitting elements distributed along the elongated support structure lengthwise. The lamp further including a light diffuser cover placed over the plurality of white-light emitting elements with the elongated support structure inserted therethrough, and a hollow lamp shade fitted over the light emitting module to surround the elongated support structure with a base opening of the hollow lamp shade interfacing the base substrate, wherein a rim of the base opening encircle the plurality of white-light emitting elements capable of illuminating the hollow lamp shade from the base opening.

20 Claims, 10 Drawing Sheets

(51) Int. Cl.

| | |
|---|---|
| ***F21V 1/14*** | (2006.01) |
| ***F21V 3/04*** | (2018.01) |
| ***F21V 23/00*** | (2015.01) |
| ***F21V 29/77*** | (2015.01) |
| *F21Y 105/18* | (2016.01) |
| *F21Y 107/30* | (2016.01) |
| *F21Y 113/17* | (2016.01) |

(52) U.S. Cl.
CPC .......... *F21V 23/009* (2013.01); *F21V 29/773* (2015.01); *F21Y 2105/18* (2016.08); *F21Y 2107/30* (2016.08); *F21Y 2113/17* (2016.08)

(58) Field of Classification Search
CPC .............. F21Y 2113/13; F21Y 2113/17; F21Y 2105/18; F21Y 2107/30; F21L 4/08; F21S 6/002; F21S 10/02; F21S 10/023
See application file for complete search history.

(56) References Cited

U.S. PATENT DOCUMENTS

| | | | | |
|---|---|---|---|---|
| 9,388,946 | B1 | 7/2016 | Stagni | |
| 10,609,871 | B1 | 4/2020 | Wang et al. | |
| 2015/0267872 | A1 * | 9/2015 | Huang | H05K 1/00 362/249.06 |
| 2018/0235051 | A1 | 8/2018 | Chen | |
| 2019/0215926 | A1 * | 7/2019 | Lay | F21L 4/08 |
| 2020/0248898 | A1 * | 8/2020 | Chen | F21V 23/0464 |

FOREIGN PATENT DOCUMENTS

| | | | |
|---|---|---|---|
| CN | 101858535 | A | 10/2010 |
| CN | 102352996 | A | 2/2012 |
| CN | 203251465 | U | 10/2013 |
| CN | 103912853 | A | 7/2014 |
| CN | 204879793 | U | 12/2015 |
| CN | 204943289 | U | 1/2016 |
| CN | 206077758 | U | 4/2017 |
| CN | 207179233 | U | 4/2018 |
| CN | 208418215 | U | 1/2019 |
| CN | 208488928 | U | 2/2019 |
| CN | 208587881 | U | 3/2019 |
| CN | 208871361 | U | 5/2019 |
| CN | 209042179 | U | 6/2019 |
| CN | 110131659 | A | 8/2019 |
| CN | 110630927 | A | 12/2019 |
| CN | 210197031 | U | 3/2020 |
| CN | 212057101 | U | 12/2020 |
| CN | 112512169 | A | 3/2021 |
| CN | 110173655 | B | 4/2021 |
| DE | 20 2010 015 388 | U1 | 3/2011 |
| KR | 10-0945028 | B1 | 3/2010 |
| KR | 10-1185253 | B1 | 9/2012 |
| KR | 10-2012-0136169 | A | 12/2012 |
| KR | 10-2014-0104162 | A | 8/2014 |
| KR | 10-1455658 | B1 | 10/2014 |
| KR | 10-1742976 | B1 | 6/2017 |
| WO | 2023/038570 | A1 | 3/2023 |

OTHER PUBLICATIONS

First Office action issued by the China National Intellectual Property Administration (CNIPA) on Jun. 14, 2024 for the corresponding Chinese patent application No. 2021801021431.

Australian Examination Report #1; dated Mar. 21, 2024; Application # 2021464163.

International Search Report; dated May 26, 2022; Application # PCT/SG21/50542.

European office action; dated Sep. 20, 2024; Application # 21956924.1.

* cited by examiner

LAMP FOR DISPLAYING MULTI-COLOR LIGHTING EFFECTS

TECHNICAL FIELD

Various embodiments generally relate to a lamp for displaying multi-color lighting effects. In particular, various embodiments generally relate to a smart lamp for displaying a variety of multi-color lighting effects in response to a control signal received by the smart lamp.

BACKGROUND

Conventionally, a lamp is to provide illumination for the purpose of lighting up a room and/or to set the mood of the room. Typically, different bulb colors may be selected and installed in the lamp depending on the location and the usage of the lamp. Generally, once the bulb is installed and the lamp is placed in the desired location, the bulb is seldom changed and/or the lamp is seldom moved to change the type of illumination and/or the mood. As technology progresses, people are looking into expanding the usage and functions of lamp to more than just lighting up a room. For example, recently, smart lamps capable of switching between different colors based on set schedules, or scene options, or synchronization with songs, movies, video games, weather, etc., or using it for visual cue to remind you of your schedule or visual cue for security, have been developed. However, such smart lamp can only switch from one color lighting to another color lighting. Hence, such smart lamp is limited to displaying only one single color lighting at each time and is not sufficient to effectively achieve the expanding desired usage by the users.

Accordingly, there is a need for a more effective and versatile lamp to address the expanding desired usage of the lamp by the users.

SUMMARY

According to various embodiments, there is provided a lamp for displaying multi-color lighting effects. The lamp including a light emitting module. The light emitting module including a base substrate having a mounting surface, a plurality of white-light emitting elements disposed on the mounting surface of the base substrate in a circular arrangement with a central axis of the light emitting module extending from a center of the circular arrangement normal to the mounting surface, an elongated support structure extending longitudinally along the central axis of the light emitting module from the mounting surface of the base substrate, and at least one row of red-green-blue-light emitting elements distributed along the elongated support structure lengthwise. The lamp including a light diffuser cover placed over the plurality of white-light emitting elements on the mounting surface of the base substrate of the light emitting module with the elongated support structure of the light emitting module inserted through a through-hole of the light diffuser cover. The lamp including a hollow lamp shade fitted over the light emitting module in a manner so as to surround the elongated support structure of the light emitting module about the central axis and with a base opening of the hollow lamp shade interfacing the base substrate of the light emitting module, wherein a rim of the base opening of the hollow lamp shape defines a boundary encircling the plurality of white-light emitting elements such that the plurality of white-light emitting elements is capable of illuminating the hollow lamp shade from the base opening of the hollow lamp shade.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DETAILED DESCRIPTION

Figure 1A:
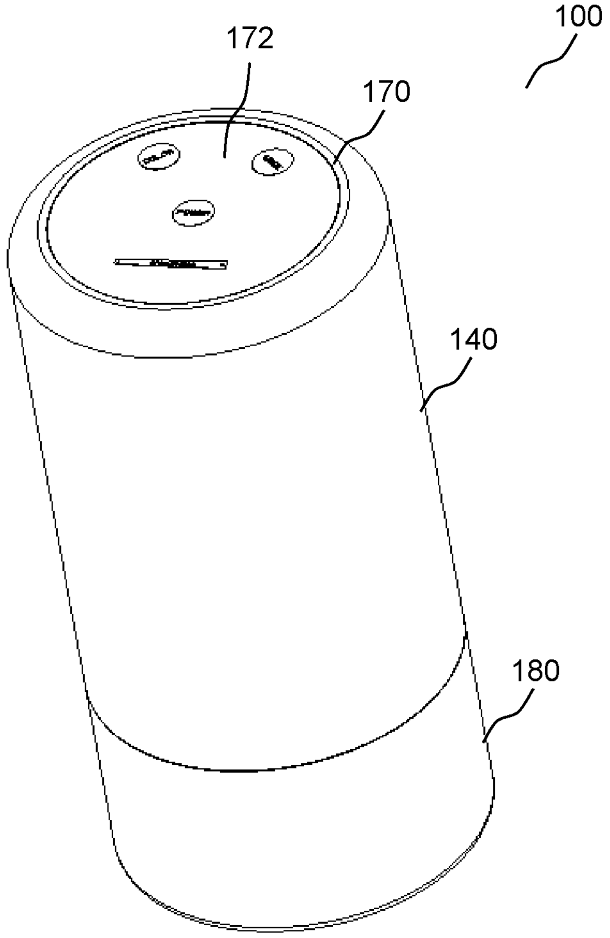
FIG. 1A shows a lamp for displaying multi-color lighting effects according to various embodiments.

Embodiments described below in the context of the apparatus are analogously valid for the respective methods, and vice versa. Furthermore, it will be understood that the embodiments described below may be combined, for example, a part of one embodiment may be combined with a part of another embodiment.

It should be understood that the terms “on”, “over”, “top”, “bottom”, “down”, “side”, “back”, “left”, “right”, “front”, “lateral”, “side”, “up”, “down” etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments generally relate to a lamp for displaying multi-color lighting effects. In particular, various embodiments generally relate to a smart lamp for displaying a variety of multi-color lighting effects in response to a control signal received by the smart lamp. According to various embodiments, the lamp may include, but not limited to, a table lamp, a desk lamp, a standing lamp, a hanging lamp, a wall lamp, a floor lamp, a ceiling lamp, or a bedside lamp. According to various embodiments, the smart lamp may be configured to communicate with an external device so as to receive a control signal for controlling the lighting effects to be displayed. The external device may include, but not limited to, a computer, a portable electronic device such as a smartphone or a mobile phone or a table, or a television, or a monitor, or a radio, or a hi-fi system, or speakers, or fan, or refrigerator, or washing machine, or alarm clock, or home automation system, or camera, or security devices, or many more. According to various embodiments, the multi-color lighting effects refers to a variety of visual lighting patterns, spectrum, animation, rhythm (including circadian rhythm), and/or effects using multiple colored light sources to illuminate different regions of the lamp.

According to various embodiments, the lamp may be configured to display multiple regions of the lamp shade of the lamp with different colors lights, wherein each region may be individually/independently illuminated with a different color lighting such that different visual lighting patterns, spectrum, animation, rhythm (including circadian rhythm), and/or effect may be achieved by controlling the illumination for each region. Each region of the hollow lamp shade may be an area or portion of the hollow lamp shade without any physical demarcations or divisions or boundaries on the hollow lamp shade to delineate the different regions. According to various embodiments, the lamp shade may be projected with different colors lightings vertically and/or horizontally to form the multiple regions. For example, the multiple regions may include vertically distributed and/or horizontally distributed regions.

The following examples pertain to various embodiments.

Example 1 is a lamp for displaying multi-color lighting effects including:

- a light emitting module comprising
  - a base substrate having a mounting surface,
  - a plurality of white-light emitting elements disposed on the mounting surface of the base substrate in a circular arrangement with a central axis of the light emitting module extending from a center of the circular arrangement normal to the mounting surface,
  - an elongated support structure extending longitudinally along the central axis of the light emitting module from the mounting surface of the base substrate, and
  - at least one row of red-green-blue-light emitting elements distributed along the elongated support structure lengthwise;
- a light diffuser cover placed over the plurality of white-light emitting elements on the mounting surface of the base substrate of the light emitting module with the elongated support structure of the light emitting module inserted through a through-hole of the light diffuser cover; and
- a hollow lamp shade fitted over the light emitting module in a manner so as to surround the elongated support structure of the light emitting module about the central axis and with a base opening of the hollow lamp shade interfacing the base substrate of the light emitting module, wherein a rim of the base opening of the hollow lamp shape defines a boundary encircling the plurality of white-light emitting elements such that the plurality of white-light emitting elements is capable of illuminating the hollow lamp shade from the base opening of the hollow lamp shade.

In Example 2, the subject matter of Example 1 may optionally include that each red-green-blue-light emitting element of the at least one row of red-green-blue-light emitting elements may be individually controllable.

In Example 3, the subject matter of Example 1 or 2 may optionally include that each row of the at least one row of red-green-blue-light emitting elements may be parallel to the central axis of the light emitting module.

In Example 4, the subject matter of any one of Examples 1 to 3 may optionally include that the lamp may include two or more rows of red-green-blue-light emitting elements distributed circumferentially around the elongated support structure of the light emitting module, wherein the two or more rows of red-green-blue-light emitting elements may be angularly spaced evenly from each other with respect to the central axis of the light emitting module.

In Example 5, the subject matter of any one of Examples 1 to 4 may optionally include that the elongated support structure of the light emitting module may include a tubular wall structure defining a hollow channel extending longitudinally through the elongated support structure along the central axis of the light emitting module, wherein a distal end of the elongated support structure away from the base substrate may include a channel-opening for the hollow channel.

In Example 6, the subject matter of Example 5 may optionally include that the elongated support structure of the light emitting module may include a plurality of fins extending longitudinally along an inner surface of the tubular wall of the elongated support structure and protruding inwards from the inner surface of the tubular wall towards the central axis of the light emitting module.

In Example 7, the subject matter of Example 6 may optionally include that the elongated support structure of the light emitting module may include an elongated hub element extending along the central axis of the light emitting module.

In Example 8, the subject matter of Example 7 may optionally include that a fin tip of each fin of the plurality of fins may be joined to the elongated hub element and a fin base of each fin of the plurality of fins may be joined to the tubular wall in a manner such that each fin of the plurality of fins may interconnect the elongated hub element and the tubular wall of the elongated support structure.

In Example 9, the subject matter of Example 7 may optionally include that the elongated hub element may include a cylindrical rod or a cylindrical tube.

In Example 10, the subject matter of any one of Examples 5 to 9 may optionally include that the hollow lamp shade may include a crown portion abutting the distal end of the elongated support structure, the crown portion being opposite the base opening of the hollow lamp shade, wherein the crown portion of the hollow lamp shade may include at least one vent hole in fluid communication with the hollow channel of the elongated support structure.

In Example 11, the subject matter of Example 10 may optionally include that an exterior surface of the crown portion of the hollow lamp shade may include at least one vent line extending radially from the at least one vent hole.

In Example 12, the subject matter of Example 11 may optionally include a control unit attached to the exterior surface of the crown portion of the hollow lamp shade in a manner such that the at least one vent line may extend underneath the control unit to a region of the exterior surface of the crown portion of the lamp shade outside the control unit.

In Example 13, the subject matter of any one of Examples 1 to 12 may optionally include that the light emitting module may include a heat sink attached to an underside surface of the base substrate, the underside surface being opposite the mounting surface of the base substrate.

In Example 14, the subject matter of any one of Examples 1 to 13 may optionally include a base unit coupled to the base substrate of the light emitting module, wherein the base unit may include a base housing to which the base substrate of the light emitting module may be coupled, wherein the base housing of the base unit may include at least one ventilation-hole extending through a panel of the base housing from an inner cavity of the base housing to outside the base housing.

In Example 15, the subject matter of Example 14 may optionally include that the at least one ventilation-hole may be located at a base panel of the base housing.

In Example 16, the subject matter of Example 14 or 15 may optionally include that the base unit may include a counter-weight housed at a bottom of the base housing of the base unit.

In Example 17, the subject matter of any one of Examples 14 to 16 may optionally include that the base unit may include a battery pack housed within the base housing of the base unit.

In Example 18, the subject matter of any one of Examples 1 to 17 may optionally include a controller electrically connected to the plurality of white-light emitting elements and the at least one row of red-green-blue-light emitting elements to control the plurality of white-light emitting elements and the at least one row of red-green-blue-light emitting elements for displaying various lighting effects.

In Example 19, the subject matter of any one of Examples 1 to 18 may optionally include that the plurality of white-light emitting elements disposed on the mounting surface of the base substrate may include a first set of white-light emitting elements having a first color temperature range and a second set of white-light emitting elements having a second color temperature range, wherein the first color temperature range may be different from the second color temperature range.

In Example 20, the subject matter of Example 19 may optionally include that the first set of white-light emitting elements may be arranged to form a first ring of white-light emitting elements on the mounting surface of the base substrate and the second set of white-light emitting elements may be arranged to form a second ring of white-light emitting elements on the mounting surface of the base substrate, wherein the first ring of white-light emitting elements and the second ring of white-light emitting elements may be arranged in a concentric manner.

In Example 21, the subject matter of Example 19 may optionally include that the plurality of white-light emitting elements may be arranged in a single ring arrangement wherein the first set of white-light emitting elements having the first color temperature range and the second set of white-light emitting elements having the second color temperature range are arranged in an alternating manner along the single ring arrangement.

In Example 22, the subject matter of any one of Examples 1 to 21 may optionally include that the elongated support structure may have a uniform cross-section along its length.

Figure 1B:
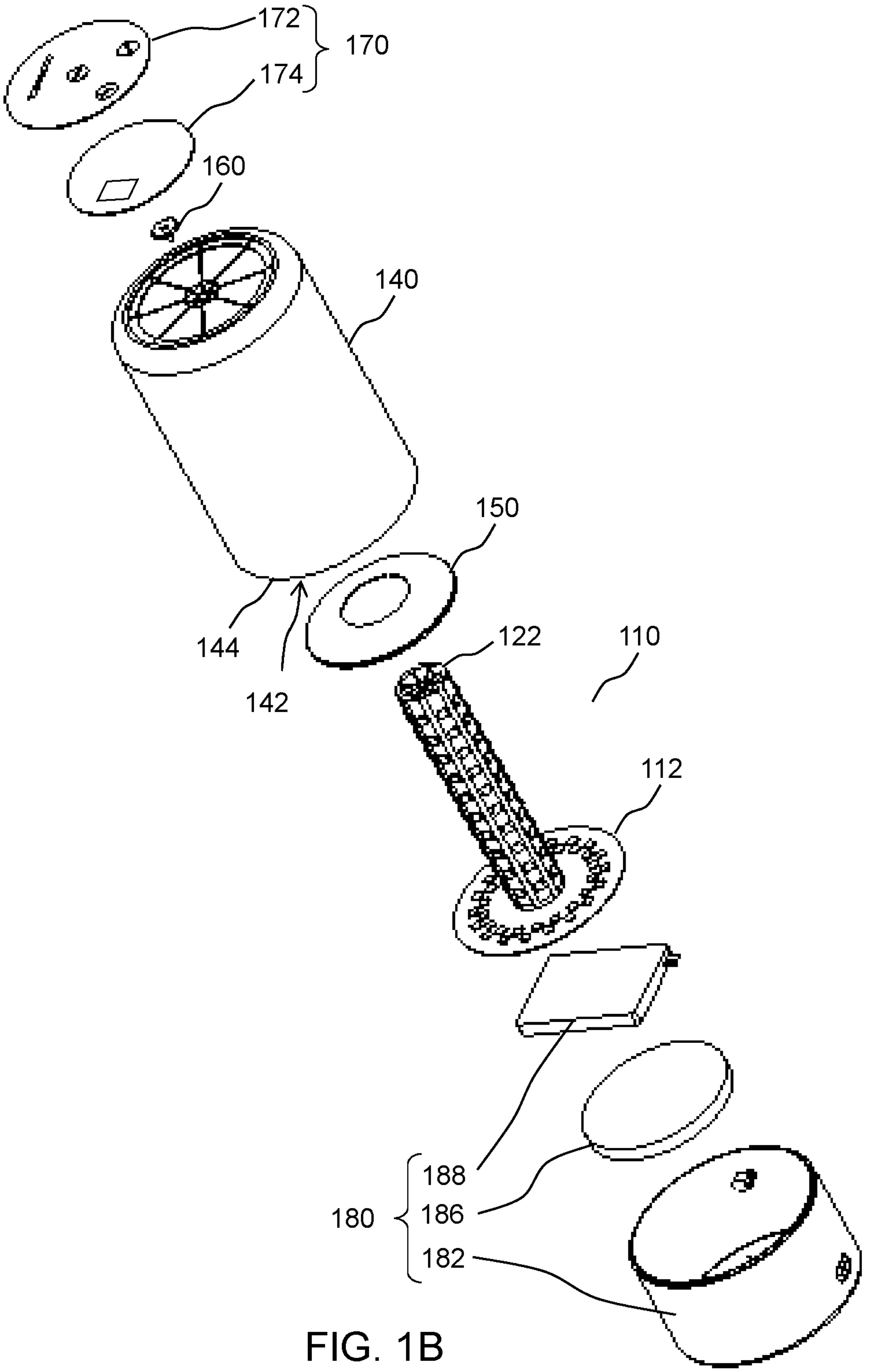
FIG. 1B shows an exploded view of the lamp of FIG. 1A according to various embodiments.

FIG. 1A shows a lamp 100 according to various embodiments. FIG. 1B shows an exploded view of the lamp 100 of FIG. 1A according to various embodiments. According to various embodiments, the lamp 100 may be configured for displaying multi-color lighting effects. According to various embodiments, the lamp 100 may be a smart lamp and may be configured to communicate with an external device so as to receive a control signal for controlling the lighting effects to be displayed. According to various embodiments, the lamp 100 may be configured to display multi-color lighting effects using multiple colored light sources to illuminate the lamp 100 to display multiple regions of different colors so as to generate a variety of visual lighting patterns, spectrum, animation, rhythm (including circadian rhythm), and/or effects.

According to various embodiments, the lamp 100 may include a light emitting module 110. According to various embodiments, the light emitting module 110 may be configured to be used for illuminating the lamp 100 to display the multi-color lighting effects. According to various embodiments, the light emitting module 110 may be configured to optimize variation of the colors in the light emitted so as to effectively and efficiently illuminate the lamp 100 to display the multi-color lighting effects.

According to various embodiments, the lamp 100 may include a hollow lamp shade 140 fitted over the light emitting module 110 such that the light emitted may be projected on the hollow lamp shade 140 to illuminate the hollow lamp shade 140 for displaying the multi-color lighting effects. Accordingly, the light emitting module 110 may be inserted into the hollow lamp shade 140. According to various embodiments, the light emitting module 110 may emit light to the hollow lamp shade 140 such that the hollow lamp shade 140 may display multiple regions of different colors on the hollow lamp shade 140, whereby each region may be independently illuminated with a desired color. Each region of the hollow lamp shade 140 may be an area or portion of the hollow lamp shade 140 without any physical demarcations or divisions or boundaries on the hollow lamp shade to delineate the different regions. Accordingly, the light emitting module 110 may be controlled to illuminate the hollow lamp shade 140 to display multiple regions of different colors so as to generate different visual lighting patterns, spectrum, animation, rhythm (including circadian rhythm), and/or effect. Hence, the multi-color lighting effects may be achieved by illuminating different regions of the hollow lamp shade 140 differently from each other using the light emitting module 110. According to various embodiments, the hollow lamp shade 140 may be of various shape including, but not limited to, spherical, cylindrical, conical, frustoconical, drum-shaped, barrel-shaped, tapered shaped, bell-shaped, or polygonal. As shown in FIG. 1A and FIG. 1B, according to an example implementation, the hollow lamp shade 140 may be cylindrical. According to various embodiments, the hollow lamp shade 140 may be made of light diffusing material including, but not limited to, plastic, acrylic, fabrics, or gels. Accordingly, the hollow lamp shade 140 may be serve as a light diffuser to diffuse or scatter the light from the light emitting module 110.

Figure 2A:
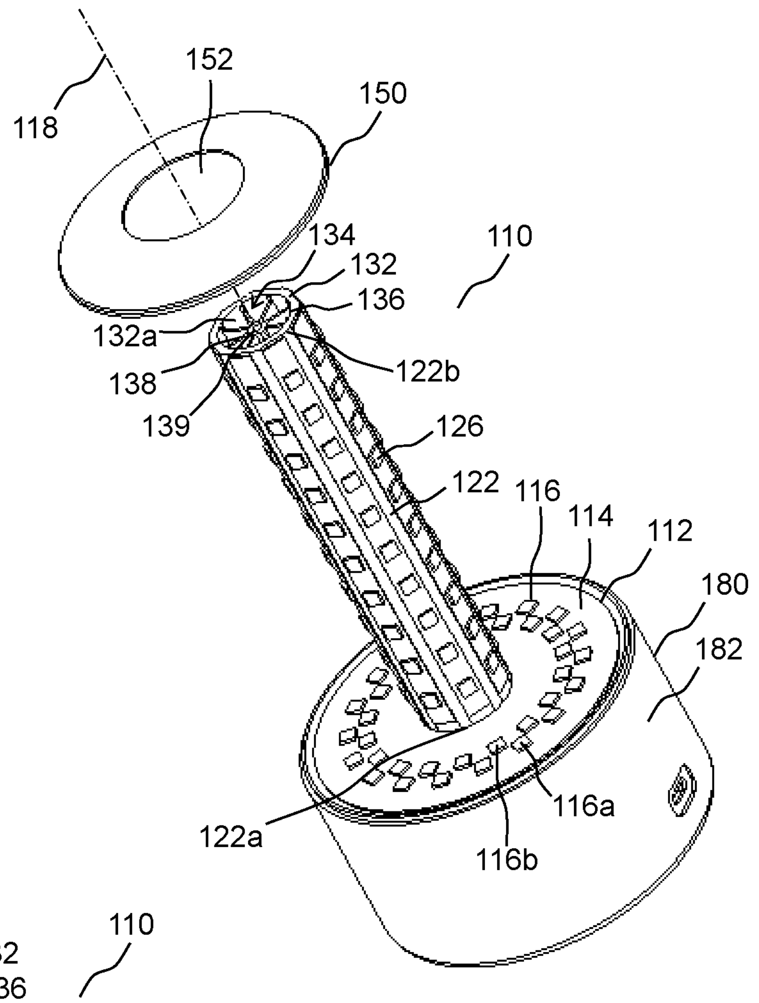
FIG. 2A and FIG. 2B shows the lamp of FIG. 1A and FIG. 1B with a hollow lamp shade removed according to various embodiments.
Figure 2B:
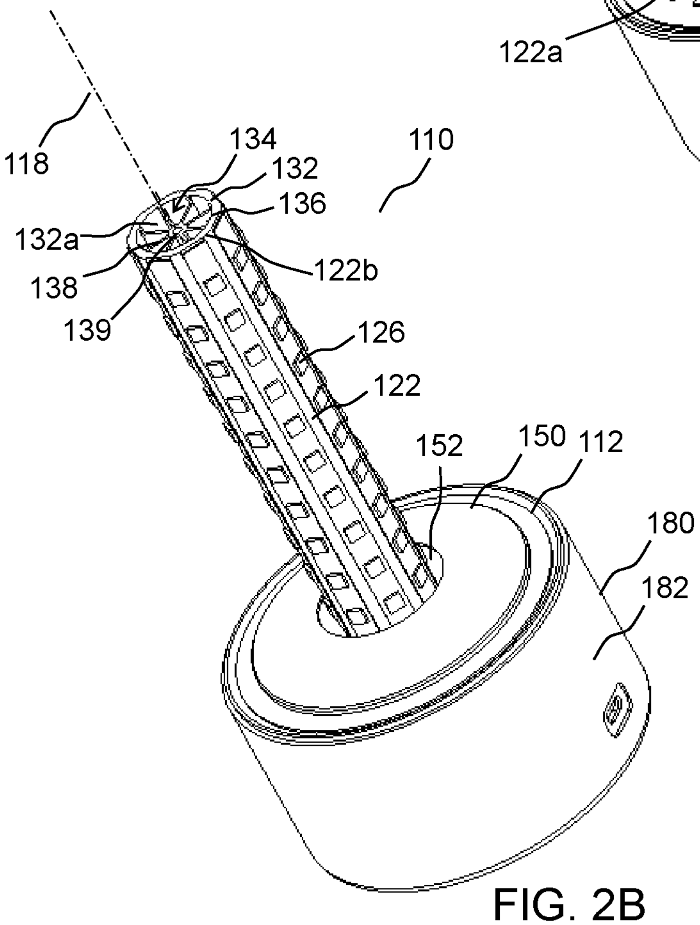

FIG. 2A and FIG. 2B shows the lamp 100 of FIG. 1A and FIG. 1B with the hollow lamp shade 140 removed according to various embodiments. According to various embodiments, the light emitting module 110 may include a base substrate 112 having a lighting-elements-mounting surface 114. According to various embodiments, the base substrate 112 may be of any suitable shape and sizes. As shown in FIG. 1B, FIG. 2A and FIG. 2B, according to an example implementation, the base substrate 112 may be of a disc shape and may be a board or a panel or a thin structure.

According to various embodiments, the base substrate 112 may serve as a supporting platform on which lighting elements may be mounted. Accordingly, the lighting-elements-mounting-surface 114 of the base substrate 112 may be a surface on which the lighting elements may be placed and/or mounted. According to various embodiments, the lighting-elements-mounting-surface 114 may be of various profiles, including but not limited to flat, concave or convex. As shown in FIG. 1B, FIG. 2A and FIG. 2B, according to an example implementation, the lighting-elements-mounting-surface 114 may be planar and flat.

According to various embodiments, the light emitting module 110 may include a plurality of white-light emitting elements 116. According to various embodiments, each white-light emitting element 116 may be any suitable white-light light source such as cool white light source and/or warm white light source. Warm white light may refer to white light with a correlated color temperature (CCT) of 1000 Kelvin to 4000 Kelvin, while cool white light may refer to white light with a CCT of 4000 Kelvin to 7000 Kelvin. According to various embodiments, each white-light emitting element 116 may include, but not limited to, a light emitting diode (LED) or an organic light emitting diode (OLED) or a polymer light emitting diode (PLED) that emits white-light. According to various embodiments, the plurality of white-light emitting elements 116 may be disposed on the lighting-elements-mounting-surface 114 of the base substrate 112. As shown in FIG. 1B, FIG. 2A and FIG. 2B, according to an example implementation, the plurality of white-light emitting elements 116 may be mounted to the lighting-elements-mounting-surface 114 of the base substrate 112.

According to various embodiments, the plurality of white-light emitting elements 116 may be in a circular arrangement. Accordingly, the plurality of white-light emitting elements 116 may be arranged to form a circular formation or a circular shape or a circular array or an outline of a circle. As shown in FIG. 1B, FIG. 2A and FIG. 2B, according to an example implementation, in the circular arrangement, the plurality of white-light emitting elements 116 may be arranged in a ring or the outline of the circle. According to various other embodiments (not shown), the plurality of white-light emitting elements 116 may be arranged to be within a perimeter of a circle so as to fill the area of the circle.

According to various embodiments, a central axis 118 of the light emitting module 110 may be extending from a center of the circular arrangement of the plurality of white-light emitting elements 116. Further, the central axis 118 of the light emitting module 110 may be normal to the lighting-elements-mounting-surface 114 of the base substrate 112. Accordingly, the central axis 118 of the light emitting module 110 may be perpendicular to the lighting-elements-mounting-surface 114 of the base substrate 112 at the center of the circular arrangement of the plurality of white-light emitting elements 116. Hence the central axis 118 of the light emitting module 110 may perpendicularly intersect the lighting-elements-mounting-surface 114 of the base substrate 112 at the center of the circular arrangement of the plurality of white-light emitting elements 116. Thus, the central axis 118 of the light emitting module 110 may serve as a common axis for the circular arrangement of the plurality of white-light emitting elements 116 and the light emitting module 110.

According to various embodiments, the light emitting module 110 may include an elongated support structure 122. Accordingly, the elongated support structure 122 may be a long structure for providing support. According to various embodiments, the elongated support structure 122 may be extending longitudinally along the central axis 118 of the light emitting module 110 from the mounting surface 114 of the base substrate 112. According to various embodiments, the elongated support structure 122 may be aligned to the central axis 118 of the light emitting module 110 so as to lie on the central axis 118 of the light emitting module 110. Accordingly, a centerline of the elongated support structure 122 may coincide with the central axis 118 of the light emitting module 110 such that the central axis 118 of the light emitting module 110 may be the longitudinal axis of the elongated support structure 122. Further, the elongated support structure 122 may be extending away or protruding from the mounting surface 114 of the base substrate 112. Accordingly, the elongated support structure 122 may be extending upright or upwards from the mounting surface 114 of the base substrate 112 in a direction away from the mounting surface 114 of the base substrate 112. According to various embodiments, the elongated support structure 122 may be perpendicular to the mounting surface 114 of the base substrate 112.

According to various embodiments, the light emitting module 110 may include at least one row of red-green-blue-light emitting elements 126. According to various embodiments, each red-green-blue-light emitting element 126 may be any suitable red-green-blue light source. According to various embodiments, each red-green-blue-light emitting element 126 may include, but not limited to, a light emitting diode (LED) or an organic light emitting diode (OLED) or a polymer light emitting diode (PLED) that emits red-green-blue-light. According to various embodiments, each red-green-blue-light emitting element 126 may be controlled to emit any one of a plurality of colors of light by combining the red, green and blue colors. According to various embodiments, the at least one row of red-green-blue-light emitting elements 126 may be in the form of a strip of red-green-blue-light emitting elements 126 as a single unit, for example, including but not limited to, a strip of red-green-blue LEDs, or a strip of red-green-blue OLEDs, or a strip of red-green-blue PLEDs. According to various embodiments, the at least one row of red-green-blue-light emitting elements 126 may be distributed along the elongated support structure 122 lengthwise. Accordingly, the red-green-blue-light emitting elements 126 of the at least one row of red-green-blue-light emitting elements 126 may form a straight line in a longitudinal direction of the elongated support structure 122. Hence, the at least one row of red-green-blue-light emitting elements 126 may be aligned to the longitudinal direction of the elongated support structure 122. According to various embodiments, the red-green-blue-light emitting elements 126 may be spaced apart longitudinally from each other. According to various embodiments, the red-green-blue-light emitting elements 126 may be spaced apart evenly at regularly interval. As shown in FIG. 1B, FIG. 2A and FIG. 2B, according to an example implementation, the at least one row of red-green-blue-light emitting elements 126 may be lined on an exterior of the elongated support structure 122 in the longitudinal direction of the elongated support structure 122.

According to various embodiments, the at least one row of red-green-blue-light emitting elements 126 may be attached or coupled to the elongated support structure 122 of the light emitting module 110. According to various embodiments, the at least one row of red-green-blue-light emitting elements 126 may be individually attached or coupled to the elongated support structure 122 of the light emitting module 110. According to various embodiments, the at least one row of red-green-blue-light emitting elements 126 may be joined together in the form of a strip. According to various embodiments, the strip of the at least one row of red-green-blue-light emitting elements 126, as a single unit, may be attached or coupled to the elongated support structure 122 of the light emitting module 110.

According to various embodiments, the lamp 100 may include a light diffuser cover 150. According to various embodiments, the light diffuser cover 150 may be made of a light diffusing material that diffuses or scatters light. The light diffusing material may include, but not limited to, plastic, acrylic, fabrics, or gels. According to various embodiments, the light diffuser cover 150 may be in the form of, including but not limited to, a light diffuser plate, a light diffuser panel, a light diffuser sheet, a light diffuser dome, or a hemispherical shaped light diffuser. According to various embodiments, the light diffuser cover 150 may be placed over the plurality of white-light emitting elements 116 on the mounting surface 114 of the base substrate 112 of the light emitting module 110. Accordingly, the light diffuser cover 150 may diffuse or scatter the light from the plurality of white-light emitting elements 116 on the mounting surface 114 of the base substrate 112. Hence, the light projected from the plurality of white-light emitting elements 116 into the hollow lamp shade 140 may be diffused or scattered. According to various embodiments, the light diffuser cover 150 may cover the plurality of white-light emitting elements 116 such that the plurality of white-light emitting elements 116 may be between the mounting surface 114 of the base substrate 112 and the light diffuser cover 150.

According to various embodiments, the light diffuser cover 150 may include a through-hole 152. According to various embodiments, the elongated support structure 122 of the light emitting module 110 may be inserted through the through-hole 152 of the light diffuser cover 150 such that the light diffuser cover 150 may be placed over the plurality of white-light emitting elements 116 on the mounting surface 114 of the base substrate 112 of the light emitting module 110. According to various embodiments, the light diffuser cover 150 may surround a proximal end portion 122*a* of the elongated support structure 122 adjoining the base substrate 112. Accordingly, the proximal end portion 122*a* of the elongated support structure 122 may be within the through-hole 152 of the light diffuser cover 150 and the light diffuser cover 150 may extend radially outwards to cover the plurality of white-light emitting elements 116 on the mounting surface 114 of the base substrate 112 around the proximal end portion 122*a* of the elongated support structure 122.

According to various embodiments, the hollow lamp shade 140 may include a base opening 142. According to various embodiments, the hollow lamp shade 140 may be fitted over the light emitting module 110 in a manner so as to surround the elongated support structure 122 of the light emitting module 110 about the central axis 118 of the light emitting module 110 and with a base opening 142 of the hollow lamp shade 140 interfacing the base substrate 112 of the light emitting module 110. Accordingly, the hollow lamp shade 140 may form an enclosure around the elongated support structure 122 of the light emitting module 110 with respect to the central axis 118. Further, the base opening 142 of the hollow lamp shade 140 and the base substrate 112 of the light emitting module 110 may be brought together so as to meet or connect or interact or contact. According to various embodiments, the base opening 142 of the hollow lamp shade 140 may be directed towards the base substrate 112 of the light emitting module 110. According to various embodiments, a rim 144 of the base opening 142 of the hollow lamp shape 140 may define a boundary encircling the plurality of white-light emitting elements 116 such that the plurality of white-light emitting elements 116 may be capable of illuminating the hollow lamp shade 140 from the base opening 142 of the hollow lamp shade 140. Accordingly, the plurality of white-light emitting elements 116 may lie within the boundary defined by the base opining 142 of the hollow lamp shade 140 so as to direct light into the hollow lamp shade 140. According to various embodiments, the light emitting module 110 may be inserted into the hollow lamp shade 140 through the base opening 142 of the hollow lamp shade 140. According to various embodiments, the elongated support structure 122 of the light emitting module 110 may lie inside the hollow lamp shade 140 and the base substrate 112 of the light emitting module 110 may be located at the base opening 142 of the hollow lamp shade 140.

According to various embodiments, each red-green-blue-light emitting element 126 of the at least one row of red-green-blue-light emitting elements 126 may be individually controllable. Accordingly, each red-green-blue-light emitting element 126 may be controlled independently to light up with a color such that different red-green-blue-light emitting elements 126 may have different colors. According to various embodiments, each red-green-blue-light emitting element 126 may be connected to a corresponding local microcontroller so as to be individually controllable by sending a control signal to the corresponding local microcontroller. According to various embodiments, the at least one row of red-green-blue-light emitting elements 126 may include a strip of individually addressable red-green-blue LEDs, or a strip of individually addressable red-green-blue OLED, or a strip of individually addressable red-green-blue PLED. According to various embodiments, the at least one row of red-green-blue-light emitting elements 126 may be connected to a local microcontroller for individually controlling each red-green-blue-light emitting element 126.

According to various embodiments, each row of the at least one row of red-green-blue-light emitting elements 126 may be parallel to the central axis 118 of the light emitting module 110. According to various embodiments, each row of the at least one row of red-green-blue-light emitting elements 126 may be supported by the elongated support structure 122 of the light emitting module 110 in a manner so as to be parallel to the central axis 118. According to various embodiments, each row of the at least one row of red-green-blue-light emitting elements 126 may be perpendicular to the base substrate 112 of the light emitting module 110.

According to various embodiments, the lamp 100 may include two or more rows of red-green-blue-light emitting elements 126. Accordingly, the lamp 100 may include two, or three, or four, or five, or six, or seven, or eight, or more rows of red-green-blue-light emitting elements 126. According to various embodiments, the two or more rows of red-green-blue-light emitting elements 126 may be distributed circumferentially around the elongated support structure 122 of the light emitting module 110. Accordingly, each of the two or more rows of red-green-blue-light emitting elements 126 may be along different longitudinal sides of the elongated support structure 122. According to various embodiments, the two or more rows of red-green-blue-light emitting elements 126 may be angularly spaced evenly from each other with respect to the central axis 118 of the light emitting module 110. For example, when there are two rows of red-green-blue-light emitting elements 126, the two rows of red-green-blue-light emitting elements 126 may be 180° apart from each other with respect to the central axis 118 of the light emitting module 110 so as to be along opposite sides of the elongated support structure 122. As another example, when there are four rows of red-green-blue-light emitting elements 126, the four rows of red-green-blue-light emitting elements 126 may be 90° apart from each other with respect to the central axis 118 of the light emitting module 110 so as to be along four longitudinal sides of the elongated support structure 122 which demarcate the elongated support structure 122 into four equal quadrants. As yet another example, when there are eight rows of red-green-blue-light emitting elements 126, the eight rows of red-green-blue-light emitting elements 126 may be 45° apart from each other with respect to the central axis 118 of the light emitting module 110 so as to be along eight longitudinal sides of the elongated support structure 122 which demarcate the elongated support structure 122 into eight equal sectors.

According to various embodiments, the elongated support structure 122 of the light emitting module 110 may include a tubular wall structure 132. According to various embodiments, the tubular wall structure 132 may define a hollow channel 134 extending longitudinally through the elongated support structure 122 along the central axis 118 of the light emitting module 110. Accordingly, the hollow channel 134 may be running through the elongated support structure 122 in the longitudinal directions or lengthwise. Further, the tubular wall structure 132 may be aligned to the central axis 118 of the light emitting module 110 such that the central axis 118 of the light emitting module 110 may be running through the hollow channel 134. According to various embodiments, a centerline of the hollow channel 134 may coincide with the central axis 118 of the light emitting module 110 such that the central axis 118 may also be a longitudinal axis of the hollow channel 134.

According to various embodiments, a distal end **122*b* of the elongated support structure 122 away from the base substrate 112 may include a channel-opening 136 for the hollow channel 134. Accordingly, the channel-opening 136 may provide access into the hollow channel 134 of the elongated support structure 122. Hence, the distal end 122*b* of the elongated support structure 122 furthest from the base substrate 122 may be opened for accessing the hollow channel 134**.

According to various embodiments, the elongated support structure 122 of the light emitting module 110 may include a plurality of fins 138 within the hollow channel 134. According to various embodiments, the plurality of fins 138 may be extending longitudinally along an inner surface **132*a* of the tubular wall 132 of the elongated support structure 122 and protruding inwards from the inner surface 132*a* of the tubular wall 132 towards the central axis 118 of the light emitting module 110. Accordingly, a fin base 138*b* of each fin 138 of the plurality of fins 138 may be joined to the inner surface 132*a* of the tubular wall 132 of the elongated support structure 122 and a fin tip 138*a* (which is opposite the fin base 138*b*) of each fin 138 of the plurality of fins 138 may be directed away from the inner surface 132*a* of the tubular wall 132**.

According to various embodiments, each fin 138 of the plurality of fins 138 may serve as an extension surface of the elongated support structure 122 to increase the rate of heat transfer to the environment by increasing the surface area for convection. Accordingly, the heat generated by the at least one row of red-green-blue-light emitting elements 126 along the elongated support structure 122 may be transferred to the elongated support structure 122 and be dissipated by the plurality of fins 138. According to various embodiments, at least one fin 138 within the hollow channel 134 may be aligned to one row of red-green-blue-light emitting elements 126 on the exterior of the elongated support structure 122.

For example, as shown in FIG. 2A, FIG. 2B, FIG. 5A and FIG. 5B, according to various embodiments, each fin 138 of the plurality of fin 138 may be a radial fin protruding radially inwards from the inner surface **132*a* of the tubular wall 132 of the elongated support structure 122 towards the central axis 118 of the light emitting module 110. Accordingly, each fin 138 of the plurality of fin 138 may be protruding in a direction along a radius of the hollow channel 134 inwards towards the central axis 118 of the light emitting module 110. According to various embodiments, the plurality of fins 138 in the form of radial fins may partition the hollow channel 134 of the elongated support structure 122 into a plurality of sectors. Accordingly, each sector of the hollow channel 134 may be between two adjacent radial fins. Hence, each sector of the hollow channel 134** may expose the two adjacent radial fins to the column of air between the two adjacent radial fins for heat transfer so as to cool the two adjacent radial fins.

According to various embodiments, the elongated support structure 122 of the light emitting module 110 may include an elongated hub element 139. According to various embodiments, the elongated hub element 139 may be extending along the central axis 118 of the light emitting module 110. Accordingly, the elongated hub element 139 may be aligned to the central axis 118 of the light emitting module 110. According to various embodiments, a centerline of the elongated hub element 139 may coincide with the central axis 118 of the light emitting module 110 such that the central axis 118 may also be the longitudinal axis of the elongated hub element 139. According to various embodiments, the tubular wall 132 of the elongated support structure 122 and the elongated hub element 139 of the elongated support structure 122 may be coaxial such that the tubular wall 132 and the elongated hub element 139 may be concentric with the tubular wall 132 surrounding the elongated hub element 139.

According to various embodiments, the fin tip **138*a* of each fin 138 of the plurality of fins 138 may be joined to the elongated hub element 139 or may be spaced apart from the elongated hub element 139. Accordingly, when the fin tip 138*a* of each fin 138 of the plurality of fins 138 is joined to the elongated hub element 139, each fin 138 of the plurality of fins 138 may be interconnecting the elongated hub element 139 and the tubular wall 132 of the elongated support structure 122. Hence, each fin 138 of the plurality of fins 138 may be extending between the elongated hub element 139 and the tubular wall 132 of the elongated support structure 122. On the other hand, when the fin tip 138*a* of each fin 138 of the plurality of fins 138 is spaced apart from the elongated hub element 139, each fin 138 of the plurality of fins 138 may not be connected to or joined to or in contact with the elongated hub element 139. Accordingly, the fin tip 138***a* of each fin 138 of the plurality of fins 138 may be free.

According to various embodiments, as an example as shown in FIG. 2A, FIG. 2B, FIG. 5A and FIG. 5B, when the plurality of fins 138 are radial fins, each fin 138 (in the form of radial fin) may be extending radially between the elongated hub element 139 and the inner surface 132*a* of the tubular wall 132 of the elongated support structure 122. Accordingly, the fin tip 138*a* of each fin 138 may be joined to the elongated hub element 139 and the fin base 138*b* of the fin 138 may be joined to the inner surface of the tubular wall 132. Hence, each fin 138 of the plurality of fins 138 may interconnect the elongated hub element 139 and the tubular wall 132 of the elongated support structure 122. According to various embodiments, the elongated hub element 139 may serve as a hub from which the plurality of fins 138 (in the form of radial fins) may be extending outwards radially.

According to various embodiments, the elongated hub element 139 of the elongated support structure 122 may be of any suitable elongated shape. According to various embodiments, the elongated hub element 139 of the elongated support structure 122 may include a cylindrical rod or a cylindrical tube.

Figure 3A:
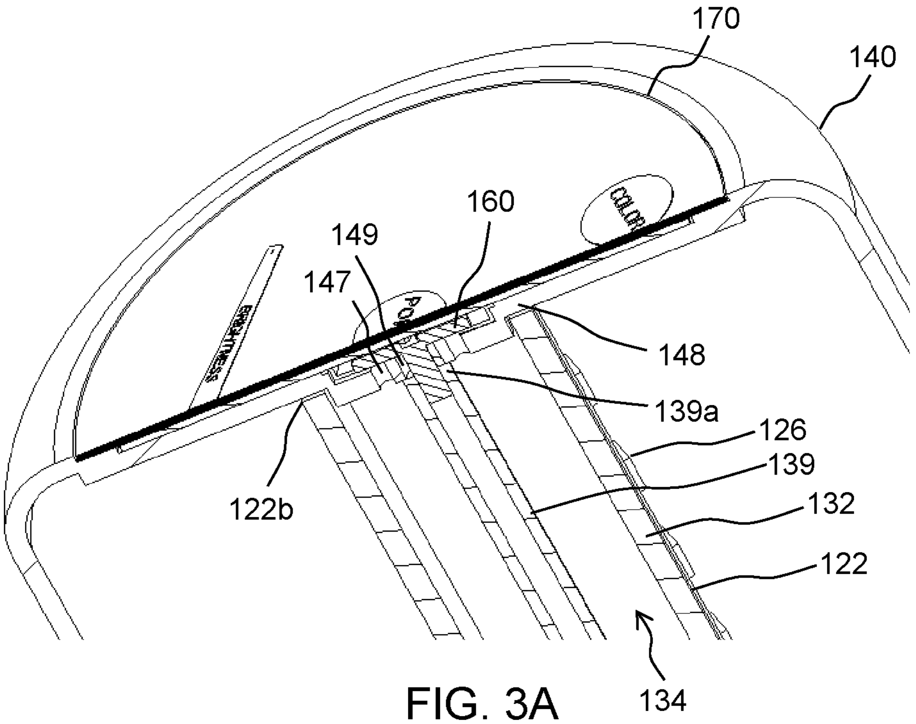
FIG. 3A shows a sectional view of atop portion of the lamp of FIG. 1A and FIG. 1B according to various embodiments.
Figure 3B:
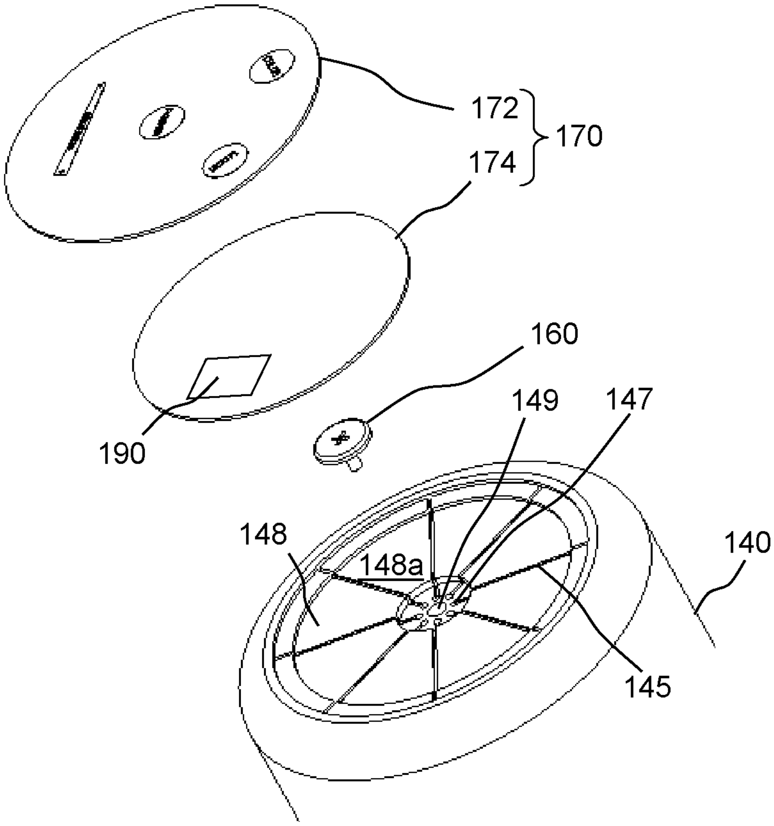
FIG. 3B shows an exploded view of the top portion of the lamp of FIG. 1A and FIG. 1B according to various embodiments.

FIG. 3A shows a sectional view of a top portion of the lamp 100 of FIG. 1A and FIG. 1B according to various embodiments. FIG. 3B shows an exploded view of the top portion of the lamp 100 of FIG. 1A and FIG. 1B according to various embodiments.

According to various embodiments, the hollow lamp shade 140 may include a crown portion 148. The crown portion 148 may be a top portion or a roof portion or a head portion of the hollow lamp shade 140. Accordingly, the crown portion 148 of the hollow lamp shade 140 may extend across atop of the hollow lamp shade 140. According to various embodiments, the crown portion 148 of the hollow lamp shade 140 may be abutting the distal end 122*b* of the elongated support structure 122 of the light emitting module 110. Accordingly, the hollow lamp shade 140 may be fitted over the light emitting module 110 such that an underside of the crown portion 148 of the hollow lamp shade 140 may be abutting the distal end 122*b* of the elongated support structure 122 of the light emitting module 110.

According to various embodiments, the crown portion 148 of the hollow lamp shade 140 may be coupled to the distal end 122*b* of the elongated support structure 122 of the light emitting module 110. According to various embodiments, the crown portion 148 of the hollow lamp shade 140 may be coupled to the distal end 122*b* of the elongated support structure 122 via a fastening element, including but not limited to, a screw fastener, a snap-fit fastener, a rivet fastener, a catch/latch, a retaining pin/clip, an adhesive, a suction element, a magnetic element, or a friction fastener. As shown in FIG. 3A and FIG. 3B as an example implementation, according to various embodiments, the crown portion 148 of the hollow lamp shade 140 may be coupled to the distal end 122*b* of the elongated support structure 122 via a screw 160. According to various embodiments, the crown portion 148 of the hollow lamp shade 140 may include a through-hole 149 through which the screw 160 may be inserted so as to be screwed into an end portion 139*a* of the elongated hub element 139 of the elongated support structure 122. Accordingly, the elongated hub element 139 of the elongated support structure 122 may include a threaded hole into which the screw 160 may be screwed so as to couple the crown portion 148 of the hollow lamp shade 140 to the elongated support structure 122. The through-hole 149 of the crown portion 148 of the hollow lamp shade 140 may be along the central axis 118 of the light emitting module 110 so as to align with the elongated hub element 139 of the elongated support structure 122 of the light emitting module 110 for coupling the crown portion 148 of the hollow lamp shade 140 to the elongated support structure 122.

According to various embodiments, the crown portion 148 of the hollow lamp shade 140 may be opposite the base opening 142 of the hollow lamp shade 140. Accordingly, the crown portion 148 and the base opening 142 may be on opposite sides of the hollow lamp shade 140. Hence, the light emitting module 110 may be inserted into the hollow lamp shade 140 with the distal end of the elongated support structure 122 of the light emitting module 110 abutting the crown portion 148 of the hollow lamp shade 140 and the base substrate 112 of the light emitting module 110 at the base opening 142 of the hollow lamp shade 140. As shown in FIG. 3A and FIG. 3B as an example implementation, when the hollow lamp shade 140 is of a cylindrical shape, the crown portion 148 and the base opening 142 may be at the two opposite circular ends of the cylindrical hollow lamp shade 140 along the longitudinal axis of the cylindrical hollow lamp shade 140. Accordingly, the crown portion 148 may be at the top end of the cylindrical hollow lamp shade 140 and the base opening 142 may be at the bottom end of the cylindrical hollow lamp shade 140 with respect to the longitudinal axis of the cylindrical hollow lamp shade 140.

According to various embodiments, the crown portion 148 of the hollow lamp shade 140 may include at least one vent hole 147. According to various embodiments, when the hollow lamp shade 140 is fitted to the light emitting module 110, the at least one vent hole 147 may be in fluid communication with the hollow channel 134 of the elongated support structure 122. Accordingly, the at least one vent hole 147 may disperse heated air from the hollow channel 134 due to heating by the at least one row of red-green-blue-light emitting elements 126 along the elongated support structure 122 of the light emitting module 110. Hence, the at least one vent hole 147 may enable heated air to be vented from within the elongated support structure 122 of the light emitting module 110 to outside of the hollow lamp shade 140. As shown in FIG. 3A and FIG. 3B as an example implementation, when the hollow channel 134 of the elongated support structure 122 of the light emitting module 110 is partitioned by the plurality of fins 138 (or the plurality of radial fins), the crown portion 148 of the hollow lamp shade 140 may include at least one vent hole 147 for each sector of the partitioned hollow channel 134. Accordingly, at least one vent hole 147 may be disposed at the crown portion 148 of the hollow lamp shade 140 in a position corresponding to one sector of the partitioned hollow channel 134. Hence, when the hollow channel 134 is partitioned into eight sectors, the crown portion 148 of the hollow lamp shade 140 may include eight vent holes 147, one vent hole 147 for each sector of the hollow channel 134. According to various embodiments, the vent holes 147 (e.g. eight vent holes in FIG. 3A and FIG. 3B) may be distributed around the fastening element, i.e. the through-hole 149 for the screw 160.

According to various embodiments, an exterior surface 148*a* of the crown portion 148 of the hollow lamp shade 140 may include at least one vent line 145. According to various embodiments, the exterior surface 148*a* of the crown portion 148 of the hollow lamp shade 140 may be opposite the underside of the crown portion 148 in abutment with the distal end 122*b* of the elongated support structure 122 of the light emitting module 110. According to various embodiments, the at least one vent line 145 may be extending radially from the at least one vent hole 147 with respect to the central axis 118 of the light emitting module 110. According to various embodiments, there may be at least one vent line 145 for each vent hole 147. As shown in FIG. 3A and FIG. 3B as an example implementation, when the crown portion 148 of the hollow lamp shade 140 has eight vent holes 147, the exterior surface 148*a* of the crown portion 148 may have eight vent lines 145, each vent line 145 radiating outward from a corresponding vent hole 147 in a radial direction with respect to the central axis 118 of the light emitting module 110.

According to various embodiments, the lamp 100 may include a control unit 170. According to various embodiments, the control unit 170 may be attached or mounted to the exterior surface 148*a* of the crown portion 148 of the hollow lamp shade 140. Accordingly, the control unit 170 may be at a top of the crown portion 148 of the hollow lamp shade 140. According to various embodiments, with the control unit 170 attached or mounted to the exterior surface 148*a* of the crown portion 148, the at least one vent line 145 at the exterior surface 148*a* of the crown portion 148 may be extending underneath the control unit 170 to a region of the exterior surface 148*a* of the crown portion 148 of the lamp shade 140 outside of the control unit 170. Accordingly, with the control unit 170 covering the at least one vent hole 147 at the exterior surface 148*a* of the crown portion 148, the at least one vent line 145 at exterior surface 148*a* of the crown portion 148 may direct the vented air out of the footprint of the control unit 170 so as to be dispersed to the external environment. Hence, the at least one vent line 145 may serve to direct air flow from the at least one vent hole 147 along the underneath of the control unit 170 to the outside of the control unit 170. According to various embodiments, the at least one vent line 145 may include, but not limited to, a channel, a conduit, a canal, a groove, a duct or a trough. As shown in FIG. 3A and FIG. 3B as an example implementation, the at least one vent line 145 may be a groove or a trough or a canal recessed into the exterior surface 148*a* of the crown portion 148 of the hollow lamp shade 140.

According to various embodiments, the control unit 170 may include an interface panel 172 and a control circuit board 174 attached to the interface panel 172. Accordingly, the control unit 170 may be an assembly of the interface panel 172 and the control circuit board 174. According to various embodiments, the interface panel 172 may be configured for receiving a user input. According to various embodiments, the control circuit board 174 may generate the control signal based on the user input received on the interface panel 172. According to various embodiments, the interface panel 172 may include, but not limited to, a touch panel, a touch pad, a touch screen, a touch slider, a panel of buttons, or a panels of keys. As shown in FIG. 3A and FIG. 3B as an example implementation, the interface panel 172 may be a touch panel. Further, the control circuit board 174 may be a printed circuit board.

Figure 4A:
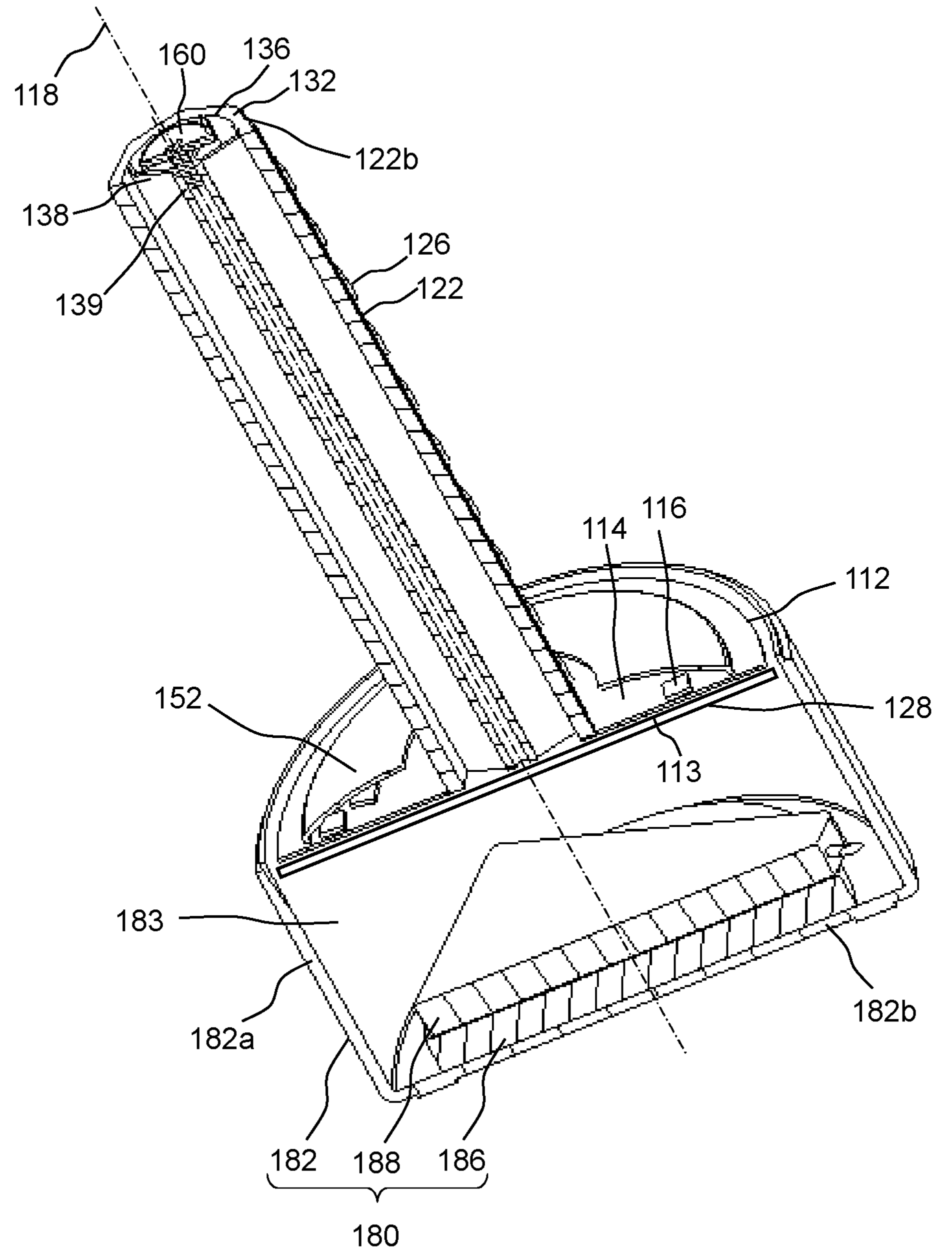
FIG. 4A shows a sectional view of the lamp with the the hollow lamp shade removed according to various embodiments.
Figure 4B:
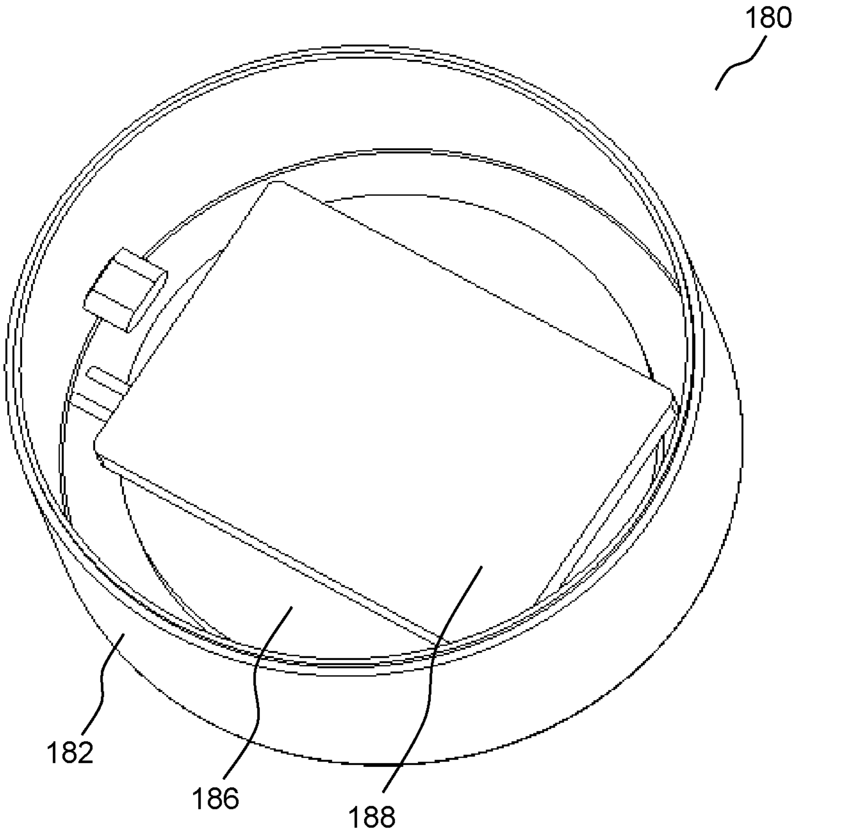
FIG. 4B shows a base unit of the lamp according to various embodiments
Figure 4C:
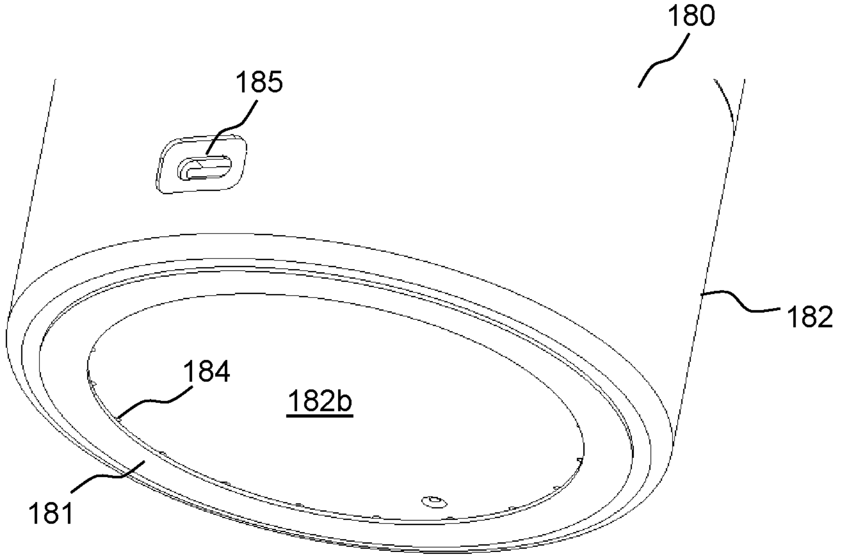
FIG. 4C shows an underside of the base unit of the lamp according to various embodiments.

FIG. 4A shows a sectional view of the lamp 100 with the the hollow lamp shade 140 removed according to various embodiments. FIG. 4B shows abase unit 180 of the lamp 100 according to various embodiments. FIG. 4C shows an underside of the base unit 180 of the lamp 100 according to various embodiments.

According to various embodiments, the light emitting module 110 may include a heat sink 128. According to various embodiments, the heat sink 128 may be coupled to the base substrate 112 of the light emitting module 110 for dissipating heat generated by the plurality of white-light emitting elements 116 on the mounting surface 114 of the base substrate 112. According to various embodiments, the heat sink 128 may be attached to an underside surface 113 of the base substrate 112. The underside surface 113 may be opposite the mounting surface 114 of the base substrate 112. According to various embodiments, the heat sink 128 may include, but not limited to, a passive heat sink or an active heat sink.

According to various embodiments, the lamp 100 may include a base unit 180. According to various embodiments, the base unit 180 may be at a bottom of the lamp 100. According to various embodiments, the light emitting module 110 of the lamp 100 may be coupled to the base unit 180 of the lamp 100, and the hollow lamp shade 140 of the lamp 100 may be fitted over the light emitting module 110 such that the light emitting module 110 may be enclosed by the base unit 180 and the hollow lamp shade 140. Accordingly, in the assembled lamp 100, only the hollow lamp shade 140 and the base unit 180 may be visible from the exterior and the light emitting module 110 may be contained inside a space defined by the hollow lamp shade 140 and the base unit 180.

According to various embodiments, the base substrate 112 of the light emitting module 110 may be coupled to the base unit 180. According to various embodiments, the base substrate 112 of the light emitting module 110 may be coupled to the base unit 180 in a manner such that the elongated support structure 122 may be extending from the base unit 180. As shown in FIG. 4A as an example implementation, according to various embodiments, the base substrate 112 of the light emitting module 110 may be coupled to a top portion of the base unit 180 such that the elongated support structure 122 may be extending from the top portion of the base unit 180.

According to various embodiments, the base unit 180 of the lamp 100 may include a base housing 182. According to various embodiments, the base housing 182 may define an inner cavity 183 inside the base housing 182. According to various embodiments, the base substrate 112 of the light emitting module 110 may be coupled to the base housing 182 of the base unit 180. As shown in FIG. 4A as an example implementation, according to various embodiments, the base substrate 112 of the light emitting module 110 may be coupled to a top portion of the base housing 182 of the base unit 180 such that the elongated support structure 122 may be extending from the top portion of the base housing 182 of the base unit 180.

According to various embodiments, the base housing 182 may include at least one ventilation-hole 184. According to various embodiments, the at least one ventilation-hole 184 may be extending through a panel of the base housing 182 from the inner cavity 183 of the base housing 182 to outside the base housing 182. According to various embodiments, the at least one ventilation-hole 184 may be extending through a wall panel 182*a* of the base housing 182 or a base panel 182*b* of the base housing 182. According to various embodiments, the at least one ventilation-hole 184 may serve to dissipate heated air within the inner cavity 183 of the base housing 182 due to the heat generated by the plurality of white-light emitting elements 116 on the mounting surface 114 of the base substrate 112. As shown in FIG. 4C as an example implementation, according to various embodiments, the at least one ventilation-hole 184 may be extending through the base panel 182*b* of the base housing 182.

According to various embodiments, the base unit 180 may include a counter-weight 186. According to various embodiments, the counter-weight 186 may be housed at a bottom of the base housing 182 of the base unit 180. Accordingly, the counter-weight 186 may be disposed within the base housing 182 of the base unit 180 and at the bottom of the base housing 182 of the base unit 180. According to various embodiments, the counter-weight 186 may serve to lower the center of gravity of the lamp 100 so as to provide stability to the lamp 100 and to minimise the chances of toppling the lamp 100. As shown in FIG. 4A and FIG. 4B, as an example implementation, according to various embodiments, the counter-weight 186 may be placed on or attached to or coupled to the base panel 182*b* of the base housing 182 of the base unit 180.

According to various embodiments, the base unit 180 may include a battery pack 188. According to various embodiments, the battery pack 188 may be housed within the base housing 182 of the base unit 180. Accordingly, the battery pack 188 may be disposed inside the base housing 182 of the base unit 180. According to various embodiments, with the battery pack 188 housed within the base housing 182 of the base unit 180, the center of gravity of the lamp 100 may be lowered so as to provide stability to the lamp 100 and to minimise the chances of toppling the lamp 100. As shown in FIG. 4A and FIG. 4B, as an example implementation, according to various embodiments, the battery pack 188 may be placed on or attached to or coupled to the counter-weight 186 of the base unit 180. According to various other embodiments (not shown), the base unit 180 may not carry the battery pack 188. Accordingly, the base unit 180 may be free of the battery pack 188 (i.e. without the battery pack 188).

According to various embodiments, the base unit 180 may include an anti-skid pad 181. According to various embodiments, the anti-skid pad 181 may be on an exterior of the base panel 182*b* of the base housing 182. Accordingly, the anti-skid pad 181 may enhance the stability of the lamp 100. As shown in FIG. 4C, as an example implementation, according to various embodiments, the anti-skid pad 181 may be of a ring-shaped attached to the base panel 182*b* of the base housing 182.

According to various embodiments, the base unit 180 may also include a power/data connector port 185. According to various embodiments, the power/data connector port 185 may be electrically connected to the battery pack 188 for charging the battery pack 188. Further, the power/data connector port 185 may be configured to receive data or signal for controlling the plurality of white-light emitting elements 116 and the at least one row of red-green-blue-light emitting elements 126. For example, according to various embodiments, the power/data connector port 185 may include, but not limited to, a Universal Serial Bus (USB) Type-C port, or a lightning port, or micro USB port, or mini USB port, or a USB port, or a DC input jack, or any other magnetic or non-magnetic connector.

According to various embodiments, the lamp 100 may include a controller 190. According to various embodiments, the controller 190 may be electrically connected to the plurality of white-light emitting elements 116 and the at least one row of red-green-blue-light emitting elements 126. According to various embodiments, the controller 190 may be disposed in any suitable location within the lamp 100. According to various embodiments, the controller 190 may be at the base substrate 112 of the light emitting module 110, the elongated support structure 122 of the light emitting module 110, the control circuit board 174 of the control unit 170, or a separate and independent circuit board housed within the base unit 180. As shown in FIG. 3B, as an example implementation, according to various embodiments, the controller 190 may be at the control circuit board 174 of the control unit 170.

According to various embodiments, the controller 190 may be configured to control the plurality of white-light emitting elements 116 and the at least one row of red-green-blue-light emitting elements 126 for displaying various lighting effects. According to various embodiments, the white light from the plurality of white-light emitting elements 116 and the red-green-blue-light of the red-green-blue-light emitting elements 126 may be combined and mix to create various types of lighting colors. According to various embodiments, the controller 190 may control the the plurality of white-light emitting elements 116 and the at least one row of red-green-blue-light emitting elements 126 to generate the multi-color lighting effects by creating different visual lighting patterns, spectrum, animation, rhythm (including circadian rhythm), and/or effects to illuminate different regions of the hollow lamp shade 140 of the lamp 100.

In various embodiments, the "controller 190" may be understood as any kind of a logic implementing entity, which may be special purpose circuitry or a processor executing software stored in a memory, firmware, or any combination thereof. Thus, in an embodiment, the "controller 190" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). The "controller 190" may also be a processor executing software, e.g. any kind of computer program, e.g. a computer program using a virtual machine code such as e.g. Java. Any other kind of implementation of the respective functions which are described in more detail throughout may also be understood as the "controller 190" in accordance with various embodiments. In various embodiments, the "controller 190" may be part of a computing system or a controller or a microcontroller or any other system providing a processing capability. According to various embodiments, such systems may include a memory which is for example used in the processing carried out by the device or system. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the controller 190 may be configured to receive a control signal from an external device, for example, including but not limited to, a computer, a portable electronic device such as a smartphone or a mobile phone or a table, or a television, or a monitor, or a radio, or a hi-fi system, or speakers, or fan, or refrigerator, or washing machine, or alarm clock, or home automation system, or camera, or security devices, or many more, and control the plurality of white-light emitting elements 116 and the at least one row of red-green-blue-light emitting elements 126 for displaying various lighting effects in response to the control signal received. According to various embodiments, the lamp 100 may be configured to be connected via wired or wireless communication with the external device for receiving control signals. For example, the lamp 100 may be configured for wired communication by plugging in of physical cable and/or may be configured for wireless communication via, including but not limited to, infra-red, Bluetooth, Wi-Fi, wireless wide area networks (WWAN), wireless local area network (WLAN), or wireless personal area network (WPAN).

As shown in FIG. 2A as an example implementation, according to various embodiments, the plurality of white-light emitting elements 116 disposed on the mounting surface 114 of the base substrate 112 may include a first set of white-light emitting elements **116*a* having a first color temperature range and a second set of white-light emitting elements 116*b* having a second color temperature range. According to various embodiments, the first color temperature range may be different from the second color temperature range. For example, according to various embodiments, each of the first color temperature range and the second color temperature range may be warm white light or cool white light. Warm white light may refer to white light with a correlated color temperature (CCT) of 1000 Kelvin to 4000 Kelvin, while cool white light may refer to white light with a CCT of 4000 Kelvin to 7000 Kelvin. According to various embodiments, a wider range of colors may be achieved by mixing and/or combining white light of different color temperature from the plurality of white-light emitting elements 116 with the red-green-blue light from the at least one row of red-green-blue-light emitting elements 126**.

As shown in FIG. 2A as an example implementation, according to various embodiments, the first set of white-light emitting elements **116*a* may be arranged to form a first ring of white-light emitting elements 116 on the mounting surface 114 of the base substrate 112 and the second set of white-light emitting elements 116*b* may be arranged to form a second ring of white-light emitting elements 116 on the mounting surface 114 of the base substrate 112. According to various embodiments, the first ring of white-light emitting elements 116*a* and the second ring of white-light emitting elements 116*b* may be arranged in a concentric manner. According to various embodiments, the concentric rings of the white-light emitting elements 116 may form the circular arrangement of the white-light emitting elements 116 on the mounting surface 114 of the base substrate 112. According to various other embodiments (not shown), the plurality of white-light emitting elements 116 may be arranged in a single ring whereby the a first set of white-light emitting elements 116*a* and the second set of white-light emitting elements 116*b*** may be arranged in an alternating manner.

Figure 7:
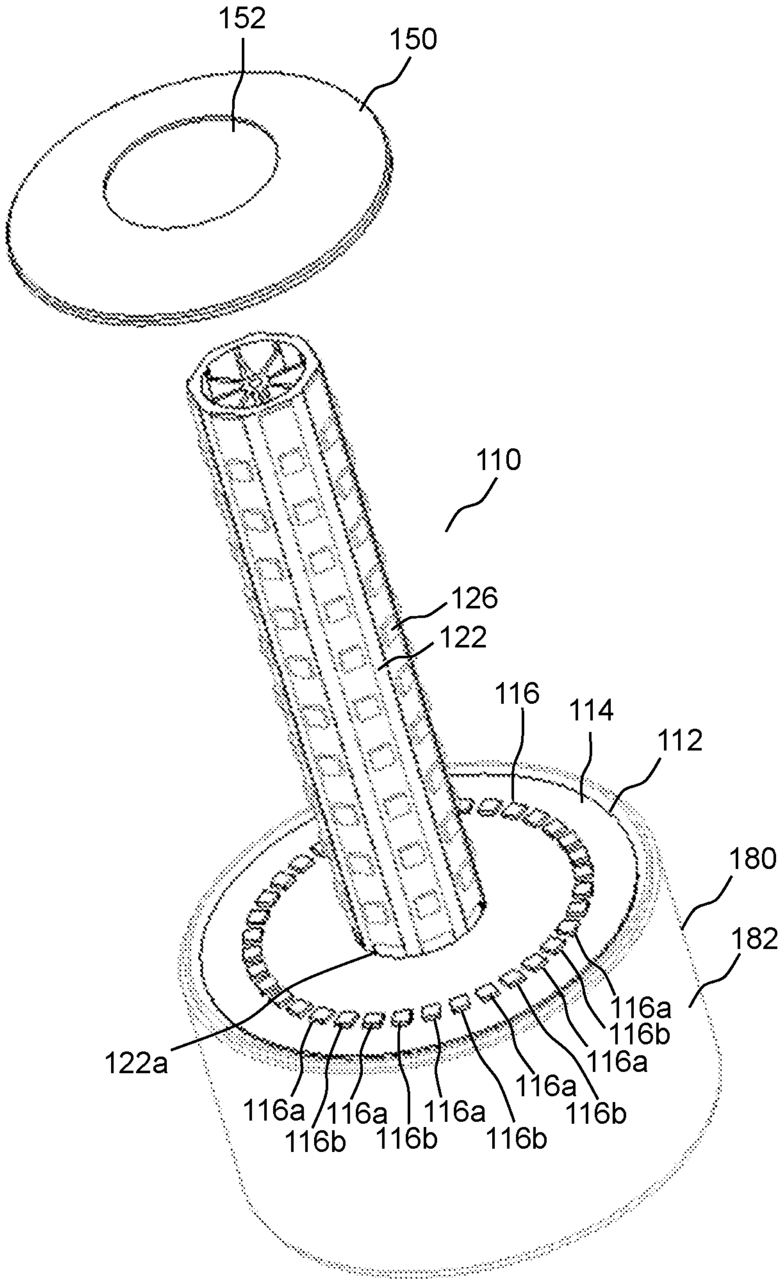
FIG. 7 shows a variation of the arrangement of white-light emitting elements on a mounting surface of a base substrate of the lamp according to various embodiments in comparison to the arrangement as shown in FIG. 2A.

FIG. 7 shows a variation of the arrangement of the white-light emitting elements 116 on the mounting surface 114 of the base substrate 112 according to various embodiments. According to various embodiments, the plurality of white-light emitting elements 116 may be disposed on the mounting surface 114 of the base substrate 112 in a single ring arrangement whereby the first set of white-light emitting elements **116*a* having the first color temperature range and the second set of white-light emitting elements 116*b*** having the second color temperature range are arranged in an alternating manner along the single ring arrangement.

As shown in FIG. 2A as an example implementation, according to various embodiments, the elongated support structure 122 of the light emitting module 110 may have a uniform cross-section along its length. Accordingly, the elongated support structure 122 of the light emitting module 110 may have a uniform diameter or width along its entire length.

According to an example implementation, according to various embodiments, the base substrate 112 of the light emitting module 110 may be a circuit board or a printed circuit board. Further, the plurality of white-light emitting elements 116 may be mounted on the circuit board or the printed circuit board.

Figure 5A:
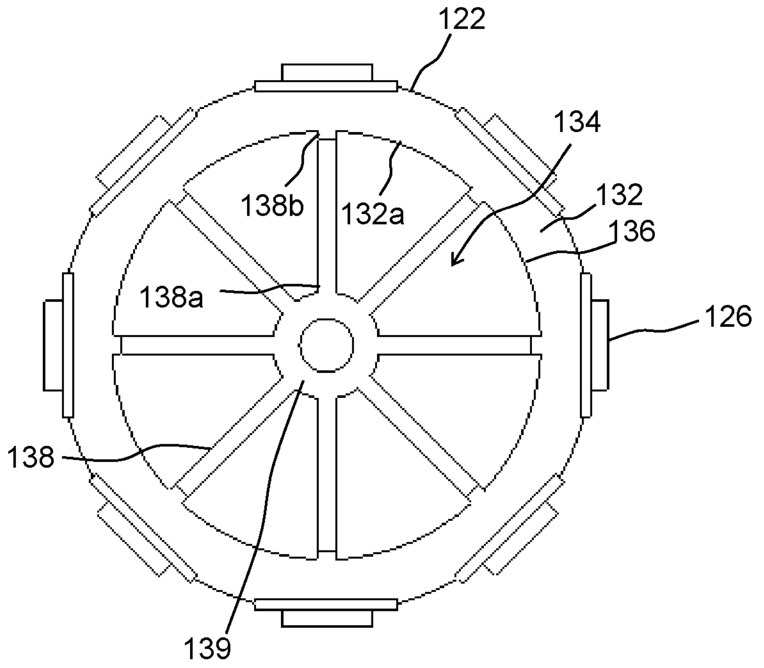
FIG. 5A shows a top view of an elongated support structure of a light emitting module of the lamp of FIG. 1A and FIG. 1B according to various embodiments.
Figure 5B:
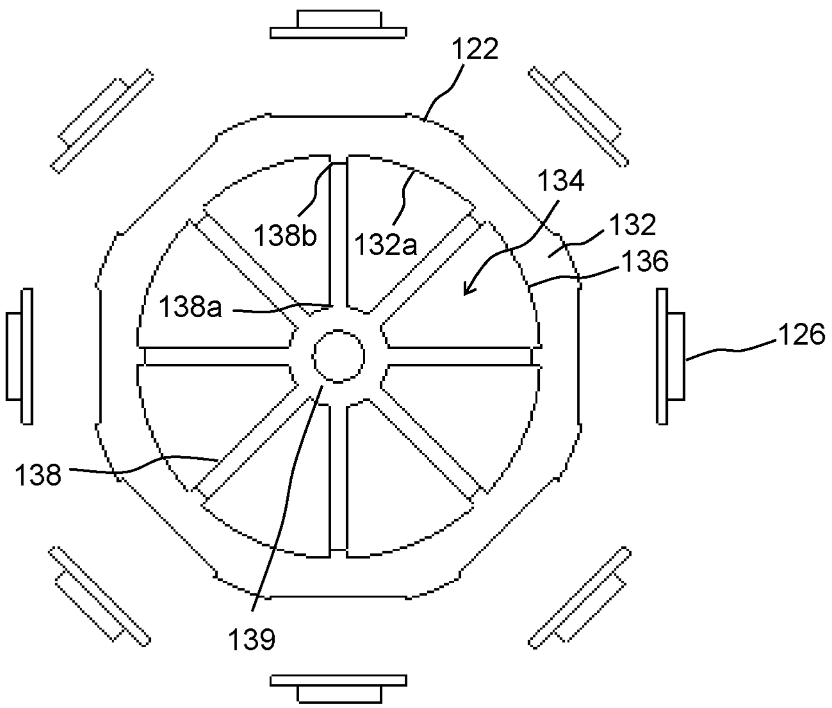
FIG. 5B shows the top view of the elongated support structure of the light emitting module of FIG. 5A with rows of red-green-blue-light emitting elements separated from the elongated support structure according to various embodiments.

FIG. 5A shows a top view of the elongated support structure 122 of the light emitting module 110 according to various embodiments. FIG. 5B shows the top view of the elongated support structure 122 of the light emitting module 110 with the at least one row of red-green-blue-light emitting elements 126 separated from the elongated support structure 122 according to various embodiments. As shown in FIG. 5A and FIG. 5B as an example implementation, according to various embodiments, the elongated support structure 122 of the light emitting module 110 may have a circular or octagonal cross-section. According to various embodiments, the light emitting module 110 may include eight rows of red-green-blue-light emitting elements 126. According to various embodiments, the eight rows of red-green-blue-light emitting elements 126 may be angularly spaced 45° apart from each other with respect to the central axis 118 of the light emitting module 110. According to various embodiments, the elongated support structure 122 of the light emitting module 110 may have eight fins 138 (e.g. eight radial fins) within the hollow channel 134 of the elongated support structure 122. According to various embodiments, each fin 138 may be aligned with each row of red-green-blue-light emitting elements 126. Accordingly, each fin 138 may extend from a portion of the inner surface **132*a* of the elongated support structure 122 corresponding to a portion of the elongated support structure 122 to which the corresponding row of red-green-blue-light emitting elements 126 is attached. According to various embodiments each row of red-green-blue-light emitting elements 126 may be a single strip of red-green-blue-light emitting elements 126**.

Figure 6A:
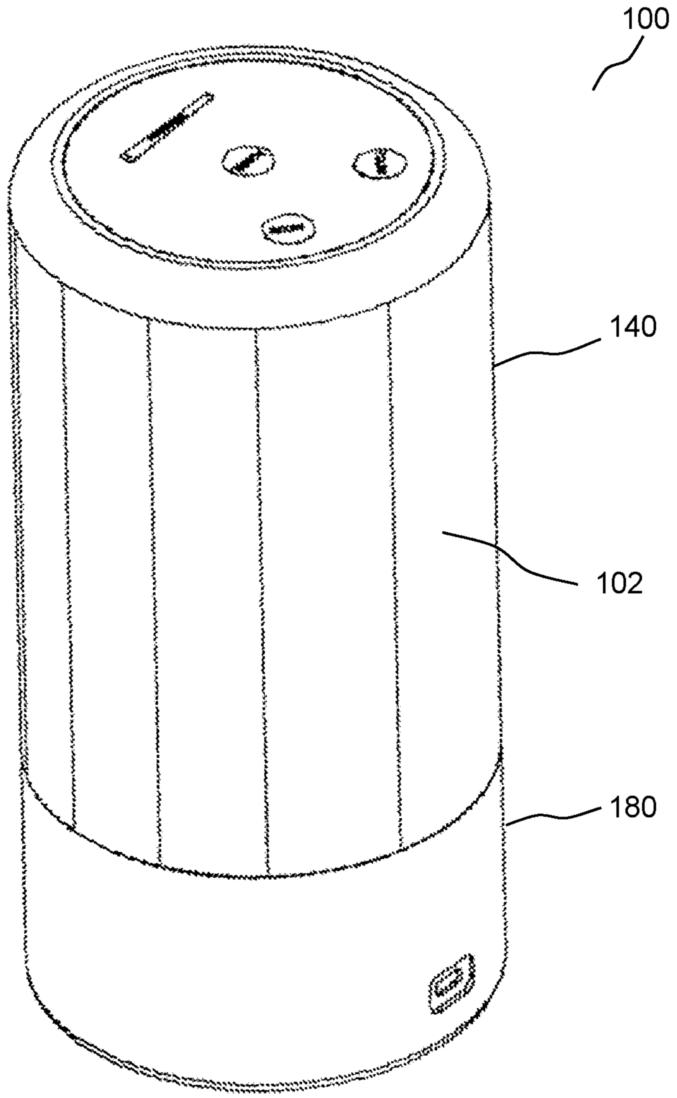
FIG. 6A shows an example of how the lamp of FIG. 1A and FIG. 1B may be illuminated to display vertically distributed regions of multiple colors by the light emitting module according to various embodiments.
Figure 6B:
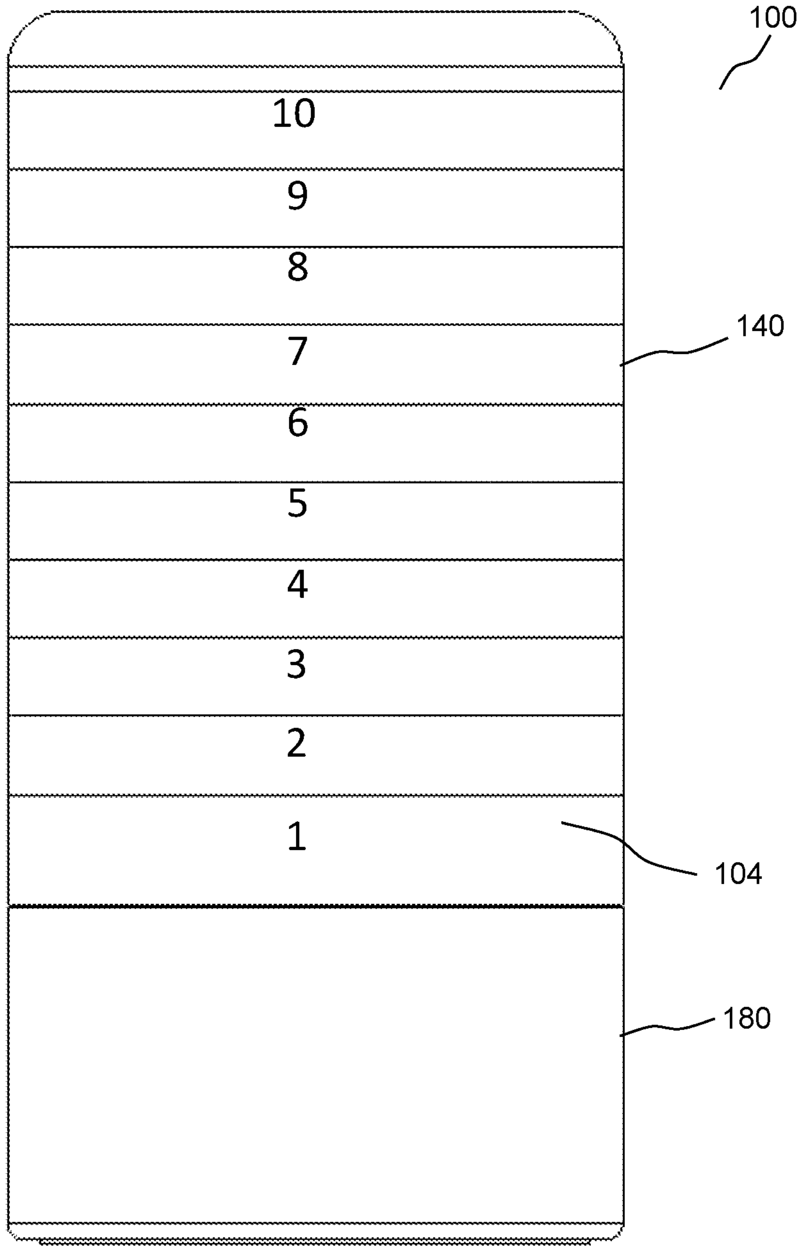
FIG. 6B shows an example of how the lamp of FIG. 1A And FIG. 1B may be illuminated to display horizontally distributed regions of multiple colors by the light emitting module according to various embodiments.

FIG. 6A shows an example of how the lamp 100 may be illuminated to display vertically distributed regions 102 of multiple colors by the light emitting module 110 according to various embodiments. FIG. 6B shows an example of how the lamp 100 may be illuminated to display horizontally distributed regions 104 of multiple colors by the light emitting module 110 according to various embodiments. According to various embodiments, each row of red-green-blue-light emitting elements 126 may illuminate a corresponding vertical region 102 of the hollow lamp shade 140 of the lamp 100. Accordingly, depending on the number of rows of red-green-blue-light emitting elements 126 disposed on the elongated support structure 122 of the light emitting module 100, the hollow lamp shade 140 of the lamp 100 may be illuminated to display a corresponding number of vertical regions 102. For example, when the light emitting module 100 has eight rows of red-green-blue-light emitting elements 126 as shown in FIG. 5A, the hollow lamp shade 140 of the lamp 100 may be illuminated to display eight vertical regions 102 of different colors. According to various embodiments, each red-green-blue-light emitting element 126 in each row of red-green-blue-light emitting elements 126 may illuminate a corresponding horizontal regions 104 of the hollow lamp shade 140 of the lamp 100 within a same vertical region 102 associated with that row of red-green-blue-light emitting elements 126. Accordingly, the red-green-blue-light emitting elements 126 at the same level along all rows of red-green-blue-light emitting elements 126 may illuminate the corresponding horizontal region 104 around the hollow lamp shade 140 of the lamp 100. For example, when each row of red-green-blue-light emitting elements 126 has ten red-green-blue-light emitting elements as shown in FIG. 2A and FIG. 2B, the hollow lamp shade 140 of the lamp 100 may be illuminated to display ten horizontal regions 102 of different colors.

According to various embodiments, with the arrangement of the hollow lamp shade 140 surrounding the elongated support structure of the light emitting module which is lined with at least one row of red-green-blue-light emitting elements 126, the lamp 100 may be controlled for vertical and/or horizontal red-green-blue zonal (segmental) lighting along the longitudinal direction (or height) of the hollow lamp shade 140. Accordingly, this configuration may open up more options of visual lighting patterns, spectrum, animation, rhythm (including circadian rhythm), and/or effects for the users.

Various embodiments have provided a lamp which may be more effective and versatile to display more options of visual lighting patterns, spectrum, animation, rhythm (including circadian rhythm), and/or effects to accommodate the expanding usage of lamp by the user. In particular, various embodiments has the advantage of making full use of the height and circumference of the lamp shade to display different regions of the lamp shade that may be individually controllable to display different color lightings. Hence, the zoning of the lamp shade into different display regions provides a unique way of enabling more options of visual lighting patterns, spectrum, animation, rhythm (including circadian rhythm), and/or effects in a lamp for the users.

While the invention has been particularly shown and described with reference to specific embodiments, it should be understood by those skilled in the art that various changes, modification, variation in form and detail may be made therein without departing from the scope of the invention as defined by the appended claims. The scope of the invention is thus indicated by the appended claims and all changes which come within the meaning and range of equivalency of the claims are therefore intended to be embraced.

The invention claimed is:

1. A lamp for displaying multi-color lighting effects comprising
- a light emitting module comprising
  - a base substrate having a mounting surface,
  - a plurality of white-light emitting elements disposed on the mounting surface of the base substrate in a circular arrangement with a central axis of the light emitting module extending from a center of the circular arrangement normal to the mounting surface,
  - an elongated support structure extending longitudinally along the central axis of the light emitting module from the mounting surface of the base substrate, and
  - at least one row of red-green-blue-light emitting elements distributed along the elongated support structure lengthwise;
- a light diffuser cover placed over the plurality of white-light emitting elements on the mounting surface of the base substrate of the light emitting module with the elongated support structure of the light emitting module inserted through a through-hole of the light diffuser cover; and
- a hollow lamp shade fitted over the light emitting module in a manner so as to surround the elongated support structure of the light emitting module about the central axis and with a base opening of the hollow lamp shade interfacing the base substrate of the light emitting module, wherein a rim of the base opening of the hollow lamp shape-shade defines a boundary encircling the plurality of white-light emitting elements such that the plurality of white-light emitting elements is capable of illuminating the hollow lamp shade from the base opening of the hollow lamp shade.

2. The lamp as claimed in claim 1, wherein each red-green-blue-light emitting element of the at least one row of red-green-blue-light emitting elements is individually controllable.

3. The lamp as claimed in claim 1, wherein each row of the at least one row of red-green-blue-light emitting elements is parallel to the central axis of the light emitting module.

4. The lamp as claimed in claim 1, wherein the lamp comprises two or more rows of red-green-blue-light emitting elements distributed circumferentially around the elongated support structure of the light emitting module, wherein the two or more rows of red-green-blue-light emitting elements are angularly spaced evenly from each other with respect to the central axis of the light emitting module.

5. The lamp as claimed in claim 1, wherein the elongated support structure of the light emitting module comprises a tubular wall structure defining a hollow channel extending longitudinally through the elongated support structure along the central axis of the light emitting module,
- wherein a distal end of the elongated support structure away from the base substrate comprises a channel-opening for the hollow channel.

6. The lamp as claimed in claim 5, wherein the elongated support structure of the light emitting module comprises a plurality of fins extending longitudinally along an inner surface of the tubular wall of the elongated support structure and protruding inwards from the inner surface of the tubular wall towards the central axis of the light emitting module.

7. The lamp as claimed in claim 6, wherein the elongated support structure of the light emitting module comprises an elongated hub element extending along the central axis of the light emitting module.

8. The lamp as claimed in claim 7, wherein a fin tip of each fin of the plurality of fins is joined to the elongated hub element and a fin base of each fin of the plurality of fins is joined to the tubular wall in a manner such that each fin of the plurality of fins interconnects the elongated hub element and the tubular wall of the elongated support structure.

9. The lamp as claimed in claim 7, wherein the elongated hub element comprises a cylindrical rod or a cylindrical tube.

10. The lamp as claimed in claim 5, wherein the hollow lamp shade comprises a crown portion abutting the distal end of the elongated support structure, the crown portion being opposite the base opening of the hollow lamp shade,
- wherein the crown portion of the hollow lamp shade comprise at least one vent hole in fluid communication with the hollow channel of the elongated support structure,
- wherein an exterior surface of the crown portion of the hollow lamp shade comprises at least one vent line extending radially from the at least one vent hole.

11. The lamp as claimed in claim 10, further comprising a control unit attached to the exterior surface of the crown portion of the hollow lamp shade in a manner such that the at least one vent line extends underneath the control unit to a region of the exterior surface of the crown portion of the lamp shade outside the control unit.

12. The lamp as claimed in claim 1, wherein the light emitting module comprises a heat sink attached to an underside surface of the base substrate, the underside surface being opposite the mounting surface of the base substrate.

13. The lamp as claimed in claim 1, further comprising a base unit coupled to the base substrate of the light emitting module, wherein the base unit comprises a base housing to which the base substrate of the light emitting module is coupled, wherein the base housing of the base unit comprises at least one ventilation-hole extending through a panel of the base housing from an inner cavity of the base housing to outside the base housing.

14. The lamp as claimed in claim 13, wherein the at least one ventilation-hole is located at a base panel of the base housing.

15. The lamp as claimed in claim 13, wherein the base unit comprises a counter-weight housed at a bottom of the base housing of the base unit, wherein the base unit comprises a battery pack housed within the base housing of the base unit.

16. The lamp as claimed in claim 1, further comprising a controller electrically connected to the plurality of white-light emitting elements and the at least one row of red-green-blue-light emitting elements to control the plurality of white-light emitting elements and the at least one row of red-green-blue-light emitting elements for displaying various lighting effects.

17. The lamp as claimed in claim 1, wherein the plurality of white-light emitting elements disposed on the mounting surface of the base substrate comprises a first set of white-light emitting elements having a first color temperature range and a second set of white-light emitting elements having a second color temperature range, wherein the first color temperature range is different from the second color temperature range.

18. The lamp as claimed in claim 17, wherein the first set of white-light emitting elements is arranged to form a first ring of white-light emitting elements on the mounting surface of the base substrate and the second set of white-light emitting elements is arranged to form a second ring of white-light emitting elements on the mounting surface of the base substrate, wherein the first ring of white-light emitting elements and the second ring of white-light emitting elements are arranged in a concentric manner.

19. The lamp as claimed in claim 17, wherein the plurality of white-light emitting elements is arranged in a single ring arrangement wherein the first set of white-light emitting elements having the first color temperature range and the second set of white-light emitting elements having the second color temperature range are arranged in an alternating manner along the single ring arrangement.

20. The lamp as claimed in claim 1, wherein the elongated support structure has a uniform cross-section along its length.

* * * * *